Patented Dec. 12, 1961

3,013,034
PROCESS FOR THE PREPARATION OF 16-ALKYL-11-OXYGENATED-16-PREGNENES
Meyer Sletzinger, North Plainfield, and Frank A. Cutler, Jr., Westfield, N.J., assignors to Merck & Co., Inc., Rahway, N.J., a corporation of New Jersey
No Drawing. Filed Jan. 30, 1959, Ser. No. 790,042
8 Claims. (Cl. 260—397.45)

This invention relates to a process for preparing 16-alkyl steroid compounds and to valuable intermediates produced therein. More particularly it relates to a method for preparing 16-alkyl-11-oxygenated-16-pregnene compounds which are valuable intermediates in the preparation of highly active anti-inflammatory steroids.

Methods are known by which 16α or 16β-alkyl steroids may be prepared. However, the known methods involve the use of costly and dangerous reagents such as organic peracids and diazomethane. For example, in one of the known methods for introducing a 17-hydroxyl substituent into a 16-alkyl-20-keto steroid, the 20-keto steroid is converted to the 20-enol acylate and the unsaturated enol acylate of the 20-keto steroid is treated with an organic peracid, e.g. perbenzoic acid, to convert the 17(20)-double bond into a 17(20)-epoxide which may be hydrolyzed to form a 17α-hydroxy-16-alkyl-20-keto steroid. Other methods used in the preparation of 16β-alkyl steroids involves the treatment of a 16-pregnen-20-one compound with a diazoalkane such as diazomethane and subsequently, pyrolysis of the alkyleneazo compound formed. The reagents described are not only dangerous to employ, but very costly to prepare and, thus, the method which avoids the use of either or both of these reagents is very desirable.

It is an object of this invention to provide processes for the preparation of 16-alkyl-11-oxygenated-16-pregnene compounds which avoid the use of the costly reagents previously employed. A further object is the provision of a simple process for the preparation of 16-alkyl-11-oxygenated-16-pregnene compounds. Such compounds may be used in the preparation of either 16α-alkyl or 16β-alkyl steroids. Other more specific objects will be apparent from the detailed description of the invention which follows.

In accordance with our invention it has now been found that 3-hydroxy (or acyloxy)-11-oxygenated-16-alkylpregnan-20-one compounds or their 20-enol derivatives are brominated to produce the corresponding 17-bromo-3-hydroxy (or acyloxy)-11-oxygenated-16-alkylpregnan-20-one compounds or 17,21-dibromo-3-hydroxy (or acyloxy)-11-oxygenated-16-alkylpregnan-20-one compounds which are then dehydrobrominated to produce 3-hydroxy (or acyloxy)-11-oxygenated-16-alkyl-16-pregnen-20-one compounds. The bromination of the 3-hydroxy (or acyloxy)-11-oxygenated-16-alkylpregnan-20-one compounds to produce the corresponding 17-monobromo or 17,21-dibromo derivatives is ordinarily conducted by contacting a solution of the steroid with a solution of bromine in the presence of a strong acid catalyst. Solvents for the bromination reaction may be chlorinated hydrocarbons such as chloroform, acetic acid or mixtures of these with a lower alkanol such as methanol. The acid catalyst may be any strong non-oxidizing acid which will not degrade the steroid molecule. Acids such as hydrobromic acid, p-toluene sulfonic acid, 3,5-dinitrobenzenesulfonic acid are satisfactory for this purpose. The temperature of the bromination may be varied between about 0° to 100° C. inclusive, although it is preferably maintained at about 45 to 50° C. in order to effect the best yields of bromo compound. When the 20-enol derivative is the compound brominated it is preferred to carry out the bromination in the presence of a tertiary amine using excess bromine.

When a molar ratio of about 2 moles of bromine to 1 mole of 20-keto steroid is employed the 17,21-dibromo derivative results and when the 20-enol derivative of the 20-keto steroid is brominated the 17-monobromo steroid is the compound isolated. Thus, when the 20-enol derivatives are employed as, for example, the 20-magnesium enolate of 3-acetoxy-16α-methyl-17(20)-pregnene-11,20-dione, the 20-cadmium enolate of 3-acetoxy-16α-methyl-17(20)-pregnen-11-one and 3,20-diacyloxy-16α-methyl-17(20)-pregnen-11-one and are contacted with 1 mole of bromine per mole of steroid, the compound obtained on isolation is 3-acetoxy-16α-methyl-17α-bromopregnane-11,20-dione. In similar manner and starting with the corresponding 11-hydroxy steroid the product obtained after bromination is 3-acetoxy-16α-methyl-17α-bromo-11β-hydroxypregnan-20-one. When the steroid employed is the 20-ketone, e.g. 3-acetoxy-16α-methylpregnane-11,20-dione or 3-acetoxy-16α-methyl-11β-hydroxypregnan-20-one and a molar ratio of 2 moles of bromine to 1 of steroid is used the compound obtained after bromination and isolation is 17α,21-dibromo-3-acetoxy-16α-methylpregnane-11,20-dione or 17α,21-dibromo-3-acetoxy-16α-methyl-11β-hydroxypregnan-20-one.

The second step of our process involves the treatment of a 17-bromo steroid, for example, a 17-bromo-3-hydroxy (or acyloxy)-16-alkyl-11-oxygenated-pregnan-20-one or a 17,21-dibromo-3-hydroxy (or acyloxy)-16-alkyl-11-oxygenated-pregnan-20-one with a dehydrobrominating agent to form the corresponding 11-oxygenated-16-pregnene compound. In the case of the 17-monobromo intermediate the compound is ordinarily contacted with a dehydrobrominating agent, e.g. a tertiary amine such as pyridine, lithium chloride in an N,N-diloweralkyl-amide such as dimethylformamide, or dimethylformamide alone, to form directly the 3-acyloxy-16-alkyl-11-oxygenated-pregnan-20-one. When this reaction is carried out in the presence of a tertiary amine such as pyridine, it is ordinarily conducted by maintaining the reaction mixture at the reflux temperature for a period of several hours, following which the product may be recovered by precipitation with water and crystallization from an organic solvent.

When the brominated intermediate employed is a 17,21-dibromo steroid as, for example, 17,21-dibromo-3-acetoxy-16α-methylpregnane-11,20-dione or 17,21-dibromo-3-acetoxy-11β-hydroxy-16α-methylpregnan-20-one the preferred method of dehydrobromination is to contact an organic solvent solution of the steroid for a brief period of time with at least two moles of an alkali metal iodide. The organic solvent employed is not critical and may be a lower aliphatic ketone, a lower alkanol or mixtures thereof with an aromatic hydrocarbon, e.g. acetone, methanol and benzene. Upon completion of the reaction the formed sodium bromide, which arises as a by product, may be removed by filtration although it is not necessarily desirable to do so, and the organic solvent is removed by evaporation under vacuo, leaving a residue comprising as the principal component, 3-acetoxy-16α-methyl-16-pregnene-11,20-dione or 3-acetoxy-11β-hydroxy-16α-methyl-16-pregnen-20-one along with a small amount of the 17-monobromo compound remaining as a by product of the reaction. The 17-monobromo compound may be converted to the desired 16-pregnene compound by a further treatment with a tertiary amine as described in the preceding paragraph. The temperature at which the treatment with sodium iodide is effected is preferably in excess of about 40° C. and may range up to the reflux temperature of the reaction mixture, temperatures between about 40 to 60° C. being preferred.

Utilizing as the brominated steroid intermediate 17-bromo-3-hydroxy (or acyloxy)-11-oxygenated-16-alkyl-pregnan-20-one, e.g. 17-bromo-3-acetoxy - 16α - methyl-pregnane - 11,20 - dione the product is 3-acetoxy-16α-methyl-16-pregnene-11,20-dione. When the 17,21-di-bromo intermediate is contacted with sodium iodide at elevated temperatures the corresponding 16-pregnene product is obtained as the major component. Thus, for example, when 17α,21-dibromo-3-acetoxy - 16α - methyl-pregnane-11,20-dione is contacted with sodium iodide at about 40° C. the major product obtained is 3-acetoxy-16α-methyl-16-pregnene-11,20-dione associated with a small amount of the by product, 17-bromo-3-acetoxy-16α-methylpregnane-11,20-dione which may be dehydrobrominated by subsequent treatment with refluxing pyridine to produce 3-acetoxy-16α-methyl-16-pregnen-11,20-dione.

The following examples are intended to be illustrative of the invention claimed and therefore the invention is not necessarily limited thereto.

EXAMPLE 1

*3α-acetoxy-16α-methyl-16-pregnene-11,20-dione*

To a solution of 1 g. of 3α-acetoxy-16α-methylpregnane-11,20-dione in 50 ml. of chloroform at 45–47° C. is added 13.7 ml. of 0.395 M bromine in chloroform over a period of 130 minutes. After a 15-minute aging period the solution is cooled to room temperature, washed with 40 ml. of 10% sodium bicarbonate solution and two 75 ml. portions of water. The solution is dried over magnesium sulfate and evaporated. The residue comprising the 17,21-dibromide is dissolved in 25 ml. of warm acetone to which 1.5 g. sodium iodide has been added and allowed to stand at room temperature for a half-hour. The mixture is filtered from precipitated sodium bromide and the filtrate is evaporated under reduced pressure and below 30° C. The residue is distributed between 25 ml. of ether and 25 ml. of 10% sodium bisulfite solution. The system is shaken intermittently until the iodine color fails to return to the ether phase. The ether phase is then washed with two 25 ml. portions of 2% sodium carbonate solution and two 50 ml. portions of water. The ether solution is dried over magnesium sulfate and evaporated, leaving a residue comprising the 17-monobromide. The monobromide is dissolved in 15 ml. of dry pyridine and heated at the reflux temperature for six hours. The solution is cooled, diluted with 75 ml. of water, and extracted with three 50 ml. portions of chloroform. The combined chloroform extract is washed successively with 75 ml. of water, two 50 ml. portions of dilute hydrochloric acid, two 50 ml. portions of 10% sodium bicarbonate solution, and three 75 ml. portions of water. The chloroform solution is evaporated under reduced pressure leaving a residue comprising 3α - acetoxy - 16 - methyl-16-pregnene-11,20-dione. The residue is chromatographed on 20 g. of acid-washed alumina to further purify the product. Similarly, following the procedure outlined above and using as the steroid starting material 3-hydroxy-16α-methylpregnane-11,20-dione the product obtained after bromination is 17,21-dibromo - 3 - hydroxypregnane-11,20-dione which is dehydrobrominated using sodium iodide to produce 3-hydroxy-16-methyl-16-pregnene-11,20-dione. Other esters may also be conveniently employed in this bromination and dehydrobromination procedure as, for example, the propionate, the butyrate, the benzoate and the products obtained after bromination and dehydrobromination are the corresponding propionates, butyrates and benzoates. Other 16-alkyl steroids, 3-acetoxy-16-ethylpregnane-11,20-dione, 3-acetoxy-16-propylpregnane-11,20-dione, and 3-acetoxy-16-butylpregnane-11,20-dione may be treated according to the above procedures to produce the corresponding 17,21-dibromo-16-alkyl steroids and the 16-alkyl-16-pregnene-11,20-dione compounds.

EXAMPLE 2

*17,21-dibromo-3α-acetoxy-16α-methylpregnane-11,20-dione*

To a solution of 10 g. (0.0258 mole) of 3α-acetoxy-16α-methylpregnane-11,20-dione in 100 ml. of chloroform at 27° is added 52.7 ml. (0.0516 mole) of 0.98 M bromine in chloroform over a period of an hour. The solution is washed with 100 ml. of 10% sodium bicarbonate and two 100 ml. portions of water. Evaporation of the chloroform leaves a crystalline mass. This is slurried in 100 ml. of boiling methanol. The slurry is chilled, filtered, washed and dried. There are thus obtained 17,21-dibromo-3α-acetoxy-16α-methylpregnane-11,20-dione, decomposing at about 215°.

EXAMPLE 3

*3α-acetoxy-16-methyl-16-pregnene-11,20-dione*

A solution of 2 g. (3.67 mm.) of crude 17,21-dibromo-3α-acetoxy-16α-methylpregnane-11,20-dione prepared as in Example 2 and 2 g. of sodium iodide in 50 ml. of acetone is heated at the reflux temperature for two hours, developing an iodine color and precipitating sodium bromide. The suspension is cooled to room temperature and filtered. The sodium bromide thus collected weighs 0.63 g. (6.17 mm.). The filtrate is concentrated under reduced pressure and the residue is distributed between 75 ml. of ether and 50 ml. of 10% sodium bisulfite solution to remove iodine. There is no return of iodine color in the organic phase as is usual when 21-iodo-20-keto-steroids are present. The ether phase is washed with two 50 ml. portions of 2% sodium carbonate solution and two 75 ml. portions of water. Drying of the ether solution over magnesium sulfate and evaporation gave crude 16-methyl-3α-acetoxy - 16 - pregnene-11,20-dione, 1.46 g.; M.P. 105–148°

$\lambda_{max.}^{methanol}$ at 248 mμ, A%=135.5. In order to make use of any possible 17-bromo-16α-methyl-3α-acetoxypregnane-11,20-dione, the entire product is dissolved in 10 ml. of dry pyridine and heated at the reflux temperature for six hours. The solution is then cooled to room temperature and diluted with 50 ml. of water, yielding a suspension of crystals. After chilling, the crystals are collected, washed with water and dried; M.P. 139–154°

$\lambda_{max.}^{methanol}$ at 249 mμ, A%=164. One gram of this material is chromatographed on 20 g. of acid-washed alumina. There is obtained in the 3:1 benzene:chloroform eluate fractions material which after recrystallization from ethanol melted at 167–169° and showed $\lambda_{max.}^{methanol}$ at 248, A%=239. Its identity as 16-methyl-3α-acetoxy-16-pregnene-11,20-dione is further established by comparison with an authentic specimen both by the identity of their infrared spectrum and by lack of melting point depression on admixture.

EXAMPLE 4

*3α-acetoxy-16-methyl-16-pregnene-11,20-dione*

PART 1.—PREPARATION OF 3α,20-DIACETOXY-16α-METHYL-17(20)-PREGNEN-11-ONE

To the ether solution of the metallic enolate prepared by reacting 3α-acetoxy-16-pregnene-11,20-dione with dimethyl cadmium as described in Example 5, is added 25 ml. of acetic anhydride dropwise at room temperature. The mixture is heated at reflux for one hour and cooled to 10° C. A solution of 11.0 ml. of concentrated hydrochloric acid in 47 ml. of water is added at 10–20° C. and the mixture allowed to stir for 10 minutes. The mixture is filtered through diatomaceous earth and extracted with saturated aqueous sodium bicarbonate until neutral. The ether layer is dried over anhydrous sodium sulfate and concentrated to dryness in vacuo to yield 16α-methyl-3α,20-diacetoxy-17(20)-pregnen-11-one.

PART 2.—PREPARATION OF 17-BROMO-3α-ACETOXY-16α-METHYLPREGNANE-11,20-DIONE

After removal of a sample, the remainder of the anol acetate prepared in Part 1 is dissolved in 78.2 ml. of glacial acetic acid and 11.7 ml. of dry pyridine. To the solution at room temperature over a period of one hour is added 20 ml. of 0.386 M bromine in acetic acid. Then water and ice totaling about 100 g. are added giving a suspension of solid. This is collected by filtration, washed and dried to give 17-bromo-3α-acetoxy-16α-methylpregnane-11,20-dione.

PART 3.—DEHYDROBROMINATION

A solution of 1.0 g. of product prepared in Part 2 in 10 ml. of pyridine is heated at the reflux temperature for six hours. The solution is cooled, diluted with 50 ml. of water and extracted with three 50 ml. portions of chloroform. The combined chloroform extracts are washed successively with 100 ml. of dilute hydrochloric acid, 100 ml. of 10% sodium bicarbonate solution, and two 100 ml. portions of water. After drying over anhydrous magnesium sulfate the chloroform is evaporated leaving a residue of crude 3α-acetoxy-16α-methyl-16-pregnene-11,20-dione.

EXAMPLE 5

3α-acetoxy-16-methyl-16-pregnene-11,20-dione

To a stirred suspension of 13.9 g. of anhydrous cadmium chloride and 0.705 g. of anhydrous cuprous chloride in 70.5 ml. of anhydrous ether under a nitrogen atmosphere is added over a 5-minute period 46.75 ml. of 3 M methyl magnesium iodide in ether. The solution is heated at the reflux temperature for 90 minutes to form the methyl cadmium derivative. A solution of 6.42 g. of 3α-acetoxy-16-pregnene-11,20-dione in 275 ml. of anhydrous ether is then added with stirring over 15 minutes, and the mixture is allowed to stir nineteen hours. A precipitate of the 20-cadmium enol derivative of 3α-acetoxy-16α-methyl-17(20) pregnen-11-one forms. The suspension is filtered through a fritted disc built into the vessel, the solids are washed with ether (100 ml.), and the solid is then resuspended in 200 ml. of benzene containing 5 ml. of dry pyridine. A solution of 47 ml. of 0.383 M bromine in benzene is added and the mixture is stirred at room temperature for 4 hours. To the reaction mixture is added 150 ml. of 10% sodium bisulfite solution and sufficient dilute hydrochloric acid to dissolve all solids. The benzene phase is separated, washed with 300 ml. of dilute hydrochloric acid, two 200 ml. portions of 10% sodium bicarbonate and two 300 ml. of water. After drying over magnesium sulfate, the benzene solution is evaporated. The residue on trituration with ether deposited material comprising 17-bromo-3α-acetoxy-16α-methylpregnane-11,20-dione. Approximately 1 g. of this material is dissolved in 10 ml. of dry pyridine and heated to the reflux temperature for about six hours, then cooled and diluted with 50 ml. of water. The resulting crystals after showing are collected, washed and dried. The material obtained in this manner is 3α-acetoxy-16-methyl-16-pregnene-11,20-dione.

EXAMPLE 6

PREPARATION OF 16α-METHYL-3-ACETOXY-PREGNANE-11,20-DIONE

To a suspension of 40.4 g. of dry cadmium chloride and 2 g. of cuprous chloride in 200 cc. of dry ether is added 136 cc. of methyl magnesium bromide solution (3 molar) over a period of 10 minutes at a temperature of 32-34° C. under nitrogen. The mixture is boiled under reflux for two hours. The mixture is cooled to 30° C. and a solution of 18.6 g. of Δ16-pregnene-3α-ol-11,20-dione acetate is added over a period of 5 minutes. The mixture is allowed to stir at 30–35° C. for 17 hours. To the mixture is added a solution of 34 cc. of concentrated hydrochloric acid and 140 cc. of water keeping the temperature at 15–25°. After stirring for 30 minutes the layers are separated and the ether layer is washed successively with 100 cc. of water, 100 cc. of saturated sodium bicarbonate solution and 100 cc. of water. The ether solution is dried over magnesium sulfate and concentrated to a volume of 60 cc. The slurry is cooled in an ice bath, filtered and the cake washed with 20 cc. of ether. The yield of 16α-methylpregnane-3α-ol-11,20-dione acetate is 83.5%, M.P. 152–153° C.

The corresponding 11β-hydroxy compound is obtained by the formation of the 20-semicarbazone of 3-acetoxy-16α-methyl-pregnane-11,20-dione and reducing said 20-semicarbazone with sodium borohydride in tetrahydrofuran to produce 3,11β-dihydroxy-16α-methylpregnane-20-one which may be acetylated with acetic anhydride in pyridine to form 3-acetoxy-11β-hydroxy-16α-methyl-pregnan-20-one.

The product obtained according to the process of this invention, e.g. 3-hydroxy (or acyloxy)-16-alkyl-11-oxygenated-16-pregnen-20-one compounds are useful as intermediates in the preparation of steroids which have valuable anti-inflammatory activity as, for example, 9α - fluoro - 11β,17α,21 - trihydroxy - 16α - methyl - 1,4-pregnadiene-3,20-dione. Thus, the product of our invention, i.e. 3-hydroxy-16α-methyl-16-pregnene-11,20-dione is contacted with alkaline hydrogen peroxide to produce 3 - hydroxy - 16,17 - oxido - 16 - methylpregnane - 11,20-dione which is converted by hydrogenation under acid conditions to a mixture of 3,17α-dihydroxy-16α-methyl-pregnane-11,20-dione and 3,17α-dihydroxy-16β-methyl-pregnane-11,20-dione which mixture may be conveniently separated by chromatography and crystallization into the respective 16α-methyl and 16β-methyl isomers. Either of these isomers may be converted to the known compounds by use of the following procedures as exemplified with the 16α-methyl isomer. The 3,17α-dihydroxy-16α-methylpregnane-11,20-dione compound is reacted with bromine in chloroform to form 21-bromo-16α - methyl - 3α,17α - dihydroxy - pregnane - 11,20-dione which is reacted with sodium iodide in acetone to produce 21-iodo-16α-methyl-3α,17α-dihydroxy-pregnane-11,20-dione which is converted without isolation to 16α-methyl - 3α,17α,21 - trihydroxy - pregnane - 11,20-dione 21-acetate by reaction with anhydrous potassium acetate; this compound is reacted with chromium trioxide in pyridine to form 16α-methyl-17α,21-dihydroxy-pregnane-3,11,20-trione 21-acetate. The 16α-methyl-16α,21-dihydroxy-pregnane-3-11,20-trione 21-acetate is reacted with bromine in glacial acetic acid-chloroform to produce 4-bromo - 16α - methyl - 17α,21 - dihydroxy - pregnane-3,11,20-trione, which is then reacted with semicarbazide to form 16α-methyl-17α,21-dihydroxy-4-pregnene-3,11,20-trione 3,20 - bissemicarbazone 21 - acetate. This 3,20-bissemicarbazone is reacted with sodium borohydride to form 16α - methyl - 11β,17α,21 - trihydroxy - 4 - pregnene-3,20-dione 3,20-bissemicarbazone which is hydrolyzed under acid conditions to form 16α-methyl-11β,17α,21 - trihydroxy - 4 - pregnene - 3,20 - dione. This latter compound is then converted to the corresponding 1,4-pregnadiene compound by contacting it with the dehydrogenating activity of microorganisms of the class Schizomycetes, for example, *Bacillus sphaericus* (ATCC–245) or *Nocardia asteroides* (ATCC 9970). The 16α-methyl - 11β,17α,21 - trihydroxy - 1,4 - pregnadiene - 3,20-dione so obtained is then reacted with acetic anhydride in the presence of pyridine to produce the corresponding 16α - methyl - 11β,17α,21 - trihydroxy - 1,4 - pregnadiene-3,20-dione 21-acetate.

This compound can also be called 16α - methyl-prednisolone acetate. Alternatively, the 16α-methyl-11β,17α,21 - trihydroxy - 4 - pregnene - 3,20 - dione, obtained as described above, upon reaction with acetic anhydride in pyridine, gives the corresponding 21-acetate which is reacted with methane sulfonyl chloride followed by potassium acetate, or phosphorus oxychloride, to produce 16α - methyl - 4,9'(11) - pregnadiene - 17α,21-diol-3,20-dione 21-acetate; the latter compound is reacted with hypobromous acid to produce 9α-bromo-16α-methyl-4-pregnene-11β,17α,21-triol-3,20-dione 21-acetate which is reacted with anhydrous potassium acetate in ethanol to produce 16α - methyl - 9,11 - epoxy - 4 - pregnene-17α,21-diol-3,20-dione 21-acetate. This 9,11-epoxide is then reacted with hydrogen fluoride in tetrahydrofuran to produce 16α - methyl - 9α - fluoro - 4 - pregnene - 11β,17α,21 - triol - 3,20 - dione 21 - acetate; this compound is reacted with a hydrolyzing agent to form 16α - methyl - 9α - fluoro - 4 - pregnene - 11β,17α,21-triol-3,20-dione 21-free alcohol. The latter compound can be similarly dehydrogenated by contact with the dehydrogenating activity of microorganisms of the class Schizomycetes to produce 16α-methyl-9α-fluoro-11β,21-dihydroxy - 1,4 - pregnadiene - 3,20 - dione (9α - fluoro-16α-methyl-pregnisolone). These reactions are described in detail in the co-pending application of Arth, Johnston and Sarett, Serial No. 642,655, filed February 27, 1957.

Various changes and modifications may be made carrying out the present invention without departing from the spirit and scope thereof. Insofar as these changes and modifications are within the purview of the annexed claims, they are to be considered as part of our invention.

We claim:

1. The process which comprises contacting an 11-oxygenated-17(20)-pregnene-20-metallic enolate having the formula

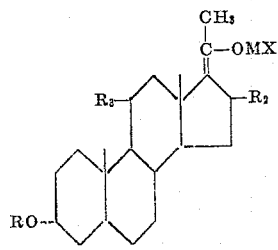

wherein R is a member selected from the group consisting of hydrogen and lower carboxylic acyl, $R_2$ is a lower alkyl substituent, M is a metal selected from the group consisting of zinc cadmium and magnesium, X is a halogen and $R_3$ is a member selected from the group consisting of =O and

with bromine in a ratio of 1 mole of bromine to 1 mole of steroid at a temperature between about 0° and 100° C. to introduce bromine into the 17-position and form a 17-bromo steroid of the formula:

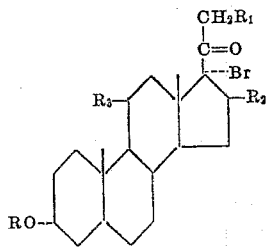

wherein R is a member selected from the group consisting of hydrogen and lower carboxylic acyl, $R_1$ is hydrogen, $R_2$ is a lower alkyl substituent and $R_3$ is a member selected from the group consisting of =O and

and contacting said 17-bromo steroid with a dehydrobrominating agent selected from the group consisting of a pyridine and an N,N'-diloweralkylamide to form an 11-oxygenated-16-pregnene compound of the formula:

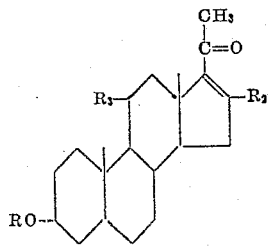

wherein R is a member selected from the group consisting of hydrogen and lower carboxylic acyl, $R_2$ is a lower alkyl substituent and $R_3$ is a member selected from the group consisting of =O and

2. The process of claim 1, wherein the metal enolate employed is a cadmium enolate.

3. The process of claim 1, wherein the metal enolate employed is a magnesium enolate.

4. The process which comprises contacting 3,20-bis-lower carboxylic acyloxy-16-lower alkyl-17(20)-pregnen-11-one with bromine in a ratio of 1 mole of bromine to 1 mole of steroid compound at a temperature between about 0° and 100° C. to form 17-bromo-3-lower carboxylic acyloxy-16-lower alkylpregnane-11,20-dione and contacting said 17-bromopregnane-11,20-dione with a dehydrobrominating agent selected from the group consisting of a pyridine and an N,N'-diloweralkylamide to form 3-lower carboxylic acyloxy-16-lower alkyl-16-pregnene-11,20-dione.

5. The process which comprises contacting a member selected from the group consisting of compounds of the formula:

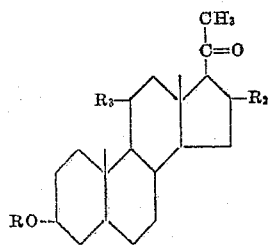

wherein R is a member selected from the group consisting of hydrogen and lower carboxylic acyl, $R_2$ is a lower alkyl substituent and $R_3$ is a member selected from the group consisting of =O and

with bromine in a ratio of about 2 moles of bromine to about 1 mole of steroid at a temperature between about 0° and 100° C. to form a 17,21-dibromo steroid of the formula:

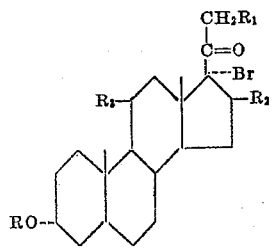

wherein R is a member selected from the group consisting of hydrogen and lower carboxylic acyl, $R_2$ is a lower alkyl substituent, $R_3$ is a member selected from the group consisting of =O and

and $R_1$ is bromine and contacting said 17,21-dibromo steroid with sodium iodide at a temperature from about 40° C. and the reflux temperature of the reaction mixture to produce a compound of the formula:

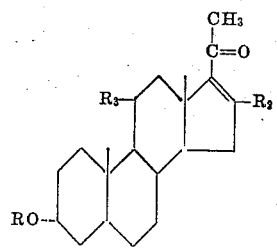

wherein R is a member selected from the group consisting of hydrogen and lower carboxylic acyl, $R_2$ is a lower alkyl substituent and $R_3$ is a member selected from the group consisting of =O and

6. The process which comprises contacting a member selected from the group consisting of cadmium 20-enol derivatives of the formula:

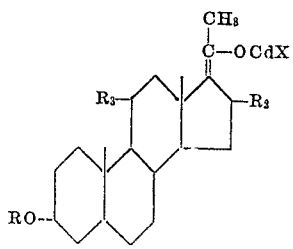

wherein R is a member selected from the group consisting of hydrogen and lower carboxylic acyl, $R_2$ is a lower alkyl substituent, X is a halogen and $R_3$ is a member selected from the group consisting of =O and

with bromine in a ratio of about 1 mole of bromine to about 1 mole of steroid at a temperature between about 0° and 100° C. to form a 17-bromo steroid of the formula:

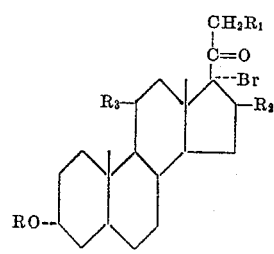

wherein R is a member selected from the group consisting of hydrogen and lower carboxylic acyl, $R_1$ is hydrogen, $R_2$ is a lower alkyl substituent and $R_3$ is a member selected from the group consisting of =O and

7. The process which comprises contacting a member selected from the group consisting of magnesium 20-enol derivatives of the formula:

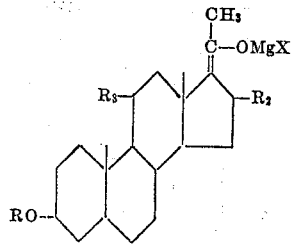

wherin R is a member selected from the group consisting of hydrogen and lower carboxylic acyl, $R_2$ is a lower alkyl substituent, X is a halogen and $R_3$ is a member selected from the group consisting of =O and

with bromine in a ratio of about 1 mole of bromine to about 1 mole of steroid compound at a temperature between about 0° and 100° C. to form a 17-bromo steroid of the formula:

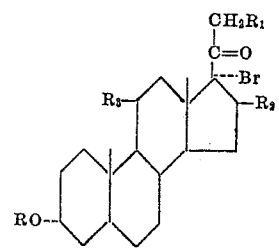

wherin R is a member selected from the group consisting of hydrogen and lower carboxylic acyl, $R_1$ is hydrogen, $R_2$ is a lower alkyl substituent and $R_3$ is a member selected from the group consisting of =O and

8. The process which comprises contacting a 17,21-dibromo-11-oxygenated pregnane compound of the formula:

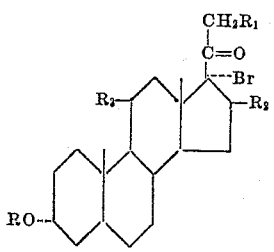

wherein R is a member selected from the group consisting of hydrogen and acyl, $R_1$ is bromine, $R_2$ is a lower alkyl substituent and $R_3$ is a member selected from the group consisting of =O and

with sodium iodide at a temperature between about 40° C. and the reflux temperature of the reaction mixture to form an 11-oxygenated-16-pregnene compound of the formula:

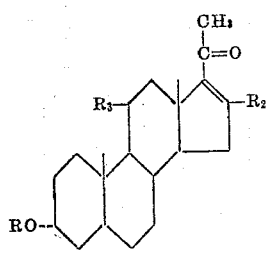

wherein R is a member selected from the group consisting of hydrogen and acyl, $R_2$ is a lower alkyl substituent and $R_3$ is a member selected from the group consisting of =O and

References Cited in the file of this patent
UNITED STATES PATENTS
2,915,535    Warrant _____ Dec. 1, 1959

OTHER REFERENCES

"Journal of American Chemical Society," vol. 75, pages 5751–3 (1953), Herzog et al.

"Journal of Organic Chemistry," vol. 20, pages 1709–16 (1955), by Lyttle et al.